United States Patent
Ponchak et al.

(10) Patent No.: US 10,370,992 B2
(45) Date of Patent: Aug. 6, 2019

(54) SEAL WITH INTEGRAL ASSEMBLY CLIP AND METHOD OF SEALING

(71) Applicant: United Technologies Corporation, Hartford, CT (US)

(72) Inventors: Jeffrey D. Ponchak, North Berwick, ME (US); Frederick M. Schwarz, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 311 days.

(21) Appl. No.: 15/052,437

(22) Filed: Feb. 24, 2016

(65) Prior Publication Data
US 2017/0241280 A1 Aug. 24, 2017

(51) Int. Cl.
*F01D 11/00* (2006.01)
*F01D 25/24* (2006.01)
*F16J 15/06* (2006.01)
*F16J 15/08* (2006.01)

(52) U.S. Cl.
CPC .......... *F01D 11/003* (2013.01); *F01D 11/005* (2013.01); *F01D 25/246* (2013.01); *F16J 15/067* (2013.01); *F16J 15/0887* (2013.01); *F05D 2240/55* (2013.01); *F05D 2240/57* (2013.01)

(58) Field of Classification Search
CPC ...... F01D 11/003; F01D 11/005; F01D 9/023; F16J 15/0887; F05D 2240/55; F02C 7/28
See application file for complete search history.

(56) References Cited

U.S. PATENT DOCUMENTS

| | | | | |
|---|---|---|---|---|
| 3,012,802 A | * | 12/1961 | Waite | F16J 15/0887 277/608 |
| 4,199,151 A | * | 4/1980 | Bartos | F01D 11/005 277/306 |
| 4,602,795 A | * | 7/1986 | Lillibridge | F16J 15/0887 277/644 |
| 5,249,814 A | * | 10/1993 | Halling | F16J 15/0887 228/214 |

(Continued)

FOREIGN PATENT DOCUMENTS

| | | |
|---|---|---|
| CA | 1159030 A | 12/1983 |
| EP | 1521036 A1 | 4/2005 |

(Continued)

OTHER PUBLICATIONS

Extended European Search Report for EP Application No. 17157961.8, dated Jul. 28, 2017, 8 pages.

(Continued)

*Primary Examiner* — Nicholas L Foster
(74) *Attorney, Agent, or Firm* — Kinney & Lange, P.A.

(57) ABSTRACT

A seal assembly for a gas turbine engine includes first and second split-ring seals. The first split-ring seal includes circumferentially separated first and second ends, laterally separated first and second edges, a first sealing lobe adjacent the first edge, and a first integral clip portion adjacent the second edge. The first sealing lobe has a curved surface extending laterally outward from the first edge. The second split-ring seal is slidably received and nested in the first seal. The second split-ring seal includes circumferentially separated third and fourth ends and laterally separated third and fourth edges.

12 Claims, 10 Drawing Sheets

(56) References Cited

U.S. PATENT DOCUMENTS

| | | | | |
|---|---|---|---|---|
| 5,716,052 A * | 2/1998 | Swensen | ............... | F16J 15/0887 277/608 |
| 6,076,835 A | 6/2000 | Ress et al. | | |
| 6,199,871 B1 * | 3/2001 | Lampes | ............... | F16J 15/0887 277/614 |
| 6,299,178 B1 * | 10/2001 | Halling | ................ | F16J 15/0887 277/644 |
| 6,352,267 B1 | 3/2002 | Rode | | |
| 6,626,440 B2 * | 9/2003 | Halling | ................ | F16J 15/0887 277/626 |
| 6,968,615 B1 * | 11/2005 | More | ................... | F16J 15/0887 277/654 |
| 7,128,323 B2 * | 10/2006 | Iguchi | .................. | F16J 15/0887 277/644 |
| 7,152,864 B2 * | 12/2006 | Amos | ................... | F01D 11/005 277/650 |
| 7,172,388 B2 | 2/2007 | Synnott | | |
| 7,178,340 B2 * | 2/2007 | Jorgensen | ............... | F01D 9/023 415/138 |
| 7,238,003 B2 | 7/2007 | Synnott et al. | | |
| 7,784,264 B2 * | 8/2010 | Weaver | ................... | F01D 9/023 60/39.37 |
| 8,016,297 B2 * | 9/2011 | Heinemann | .......... | F01D 11/005 277/644 |
| 9,708,922 B1 * | 7/2017 | Davis | ................... | F01D 11/005 |
| 9,850,773 B2 * | 12/2017 | Zelesky | ................. | F01D 11/005 |
| 9,879,555 B2 * | 1/2018 | Moehrle | ................ | F01D 11/005 |
| 2003/0051475 A1 | 3/2003 | Allen et al. | | |
| 2005/0057003 A1 * | 3/2005 | Iguchi | .................. | F16J 15/0887 277/591 |
| 2005/0073114 A1 * | 4/2005 | Amos | ................... | F01D 11/005 277/644 |
| 2006/0045745 A1 * | 3/2006 | Synnott | ................ | F01D 11/003 416/219 R |
| 2006/0045746 A1 * | 3/2006 | Synnott | ................ | F01D 11/003 416/219 R |
| 2008/0053107 A1 | 3/2008 | Weaver et al. | | |
| 2009/0243228 A1 * | 10/2009 | Heinemann | .......... | F01D 11/005 277/595 |
| 2014/0290269 A1 | 10/2014 | Lefevre et al. | | |
| 2015/0184528 A1 | 7/2015 | Belsom | | |
| 2015/0345319 A1 * | 12/2015 | Zelesky | ............... | F16J 15/0887 277/591 |
| 2016/0003080 A1 * | 1/2016 | Mcgarrah | ............ | F01D 11/003 415/173.1 |
| 2016/0084099 A1 * | 3/2016 | Davis | ................... | F01D 11/003 415/173.1 |
| 2017/0074111 A1 * | 3/2017 | Fitzpatrick | ............ | F01D 11/005 |
| 2018/0017168 A1 * | 1/2018 | Davis | .................. | F16J 15/3284 |
| 2018/0100406 A1 * | 4/2018 | Galle | ..................... | F01D 11/08 |

FOREIGN PATENT DOCUMENTS

| | | |
|---|---|---|
| EP | 2930312 A2 | 10/2015 |
| EP | 2949874 A1 | 12/2015 |
| WO | WO2008/114185 A1 | 9/2008 |
| WO | WO2014133958 A1 | 9/2014 |

OTHER PUBLICATIONS

Extended European Search Report for EP Application No. 16201699.2, dated May 23, 2017, 9 pages.

* cited by examiner

SEAL WITH INTEGRAL ASSEMBLY CLIP AND METHOD OF SEALING

BACKGROUND

The present application relates generally to seal assemblies, and more particularly to multi-ply split-ring seals.

A standard full-loop W-seal used between two static components in a gas turbine engine compressor or turbine section has a tendency to be inadvertently pinched due to blind assembly of surrounding components and delicate construction, and a tendency to buckle during operation due to thermal expansion. A need exists for a seal assembly that is less susceptible to pinching during assembly and buckling upon thermal expansion.

SUMMARY

In one aspect of the present invention, a seal assembly for a gas turbine engine includes first and second split-ring seals. The first split-ring seal includes circumferentially separated first and second ends, laterally separated first and second edges, a first sealing lobe adjacent the first edge, and a first integral clip portion adjacent the second edge. The first sealing lobe has a curved surface extending laterally outward from the first edge. The second split-ring seal is slidably received and nested in the first seal. The second split-ring seal includes circumferentially separated third and fourth ends and laterally separated third and fourth edges.

In another aspect of the present invention, a method of sealing a cavity in a gas turbine engine includes clipping a portion of a multi-ply split-ring seal to a first component of a gas turbine engine, and compressing a portion of each ply of the multi-ply seal between the first component and a second component of the gas turbine engine.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A multi-ply seal with an integral clip and optional heat shield can facilitate assembly in a gas turbine engine and reduce or eliminate seal buckling due to thermal expansion. Although the present disclosure relates to seal assemblies used in gas turbine engines, it will be understood by one skilled in the art that use of the disclosed seal assemblies is not limited to gas turbine engines, but extends to multiple applications, particularly those that use W-type or related compressible seals to form a fluid barrier between two static components.

Figure 1:
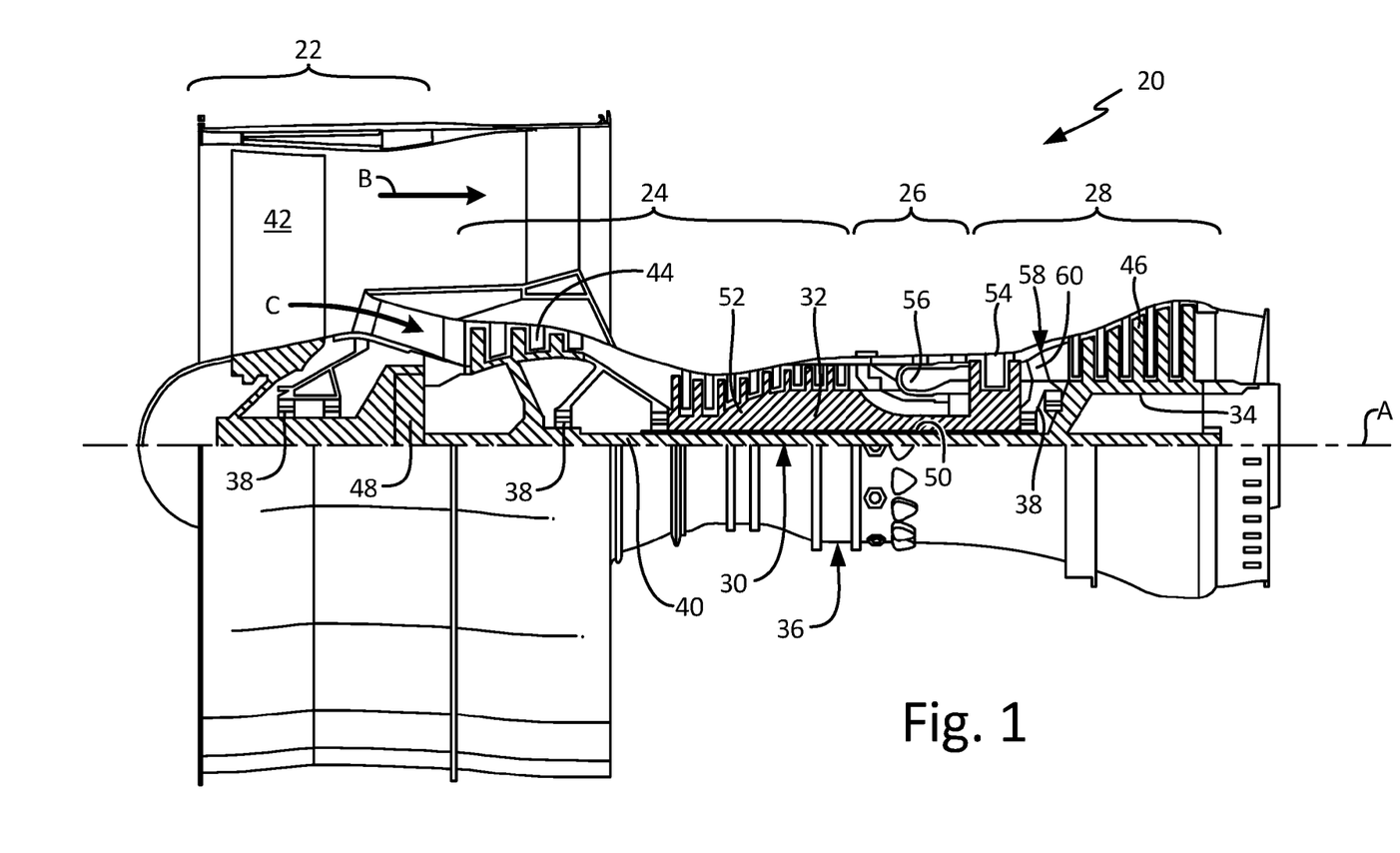
FIG. 1 is a quarter-sectional view of a gas turbine engine.

FIG. 1 is a quarter-sectional view of a gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

Figure 2:
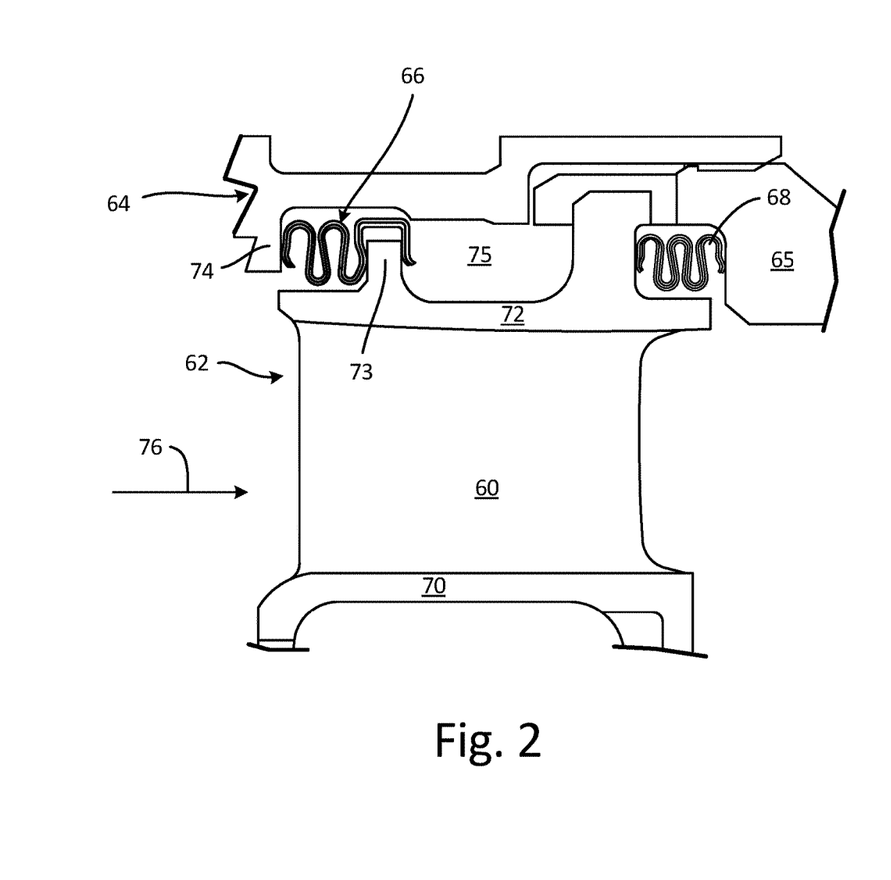
FIG. 2 is a cross-sectional view of a compressor vane assembly of the gas turbine engine.

FIG. 2 is a cross-sectional view of a compressor vane assembly of the gas turbine engine. FIG. 2 shows component 62, components 64 and 65, seal assembly 66 positioned in a forward compartment between components 62 and 64, and seal 68 positioned in an aft compartment between components 62 and 65. As shown in FIG. 2, component 62 can be a compressor stator ring having vane 60, inner band 70, and outer band 72. Inner and outer bands 70 and 72 can be located on either side of vane 60. Outer band 72 can include flange 73 extending radially outward from outer band 72. As shown in FIG. 2, component 64 can be a compressor support case having a flange 74 extending radially inward toward outer band 72. Seal assembly 66 can seal cooling cavity 75 between components 62 and 64 from core gas flow 76. During normal operation, a pressure differential across seal assembly 66 can be low, generally around 10-30 psi (69-207 kPa). During certain engine operating conditions, the pressure differential across seal assembly 66 can be as high as 150 psi (1034 kPa) Seal 68 can serve as a prime seal; whereas seal assembly 66 can serve as a redundant seal should seal 68 be compromised. Although FIG. 2 illustrates use of seal assembly 66 in a compressor section, it will be understood by one skilled in the art that the seal assemblies of the present disclosure can be used in multiple sections of the gas turbine engine as well as a variety of devices unrelated to gas turbine engines.

Figure 3:
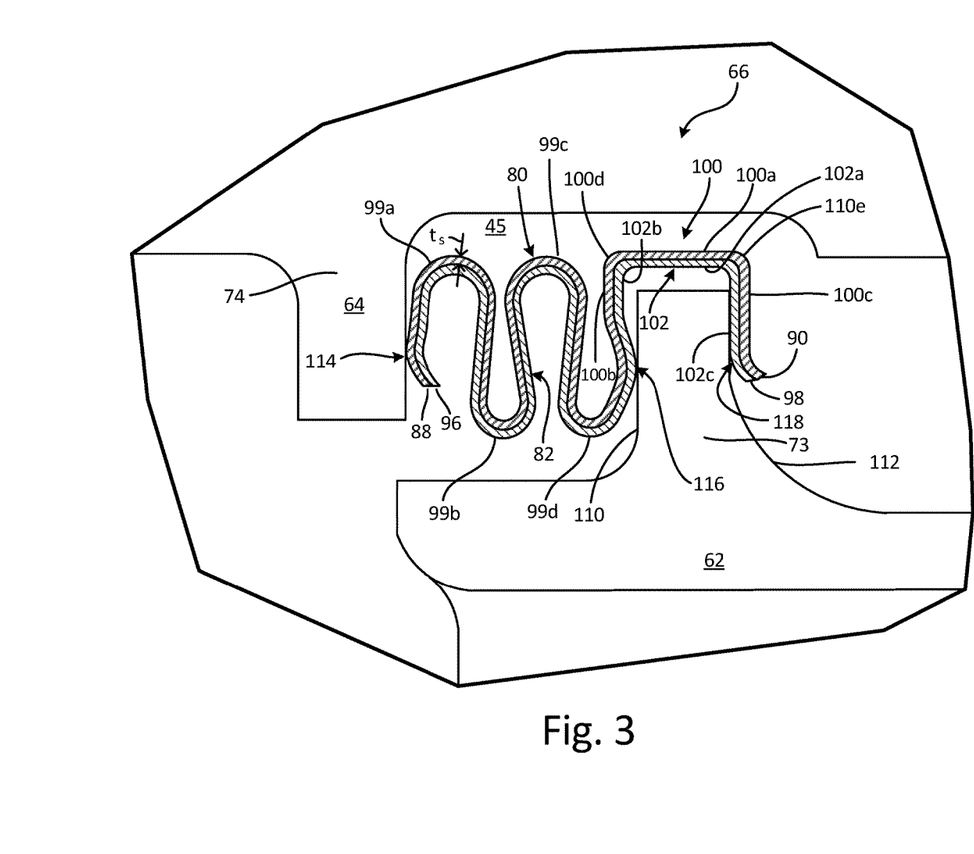
FIG. 3 is a cross-sectional view of one embodiment of a multi-ply split-ring seal with integral assembly clip.
Figure 4:
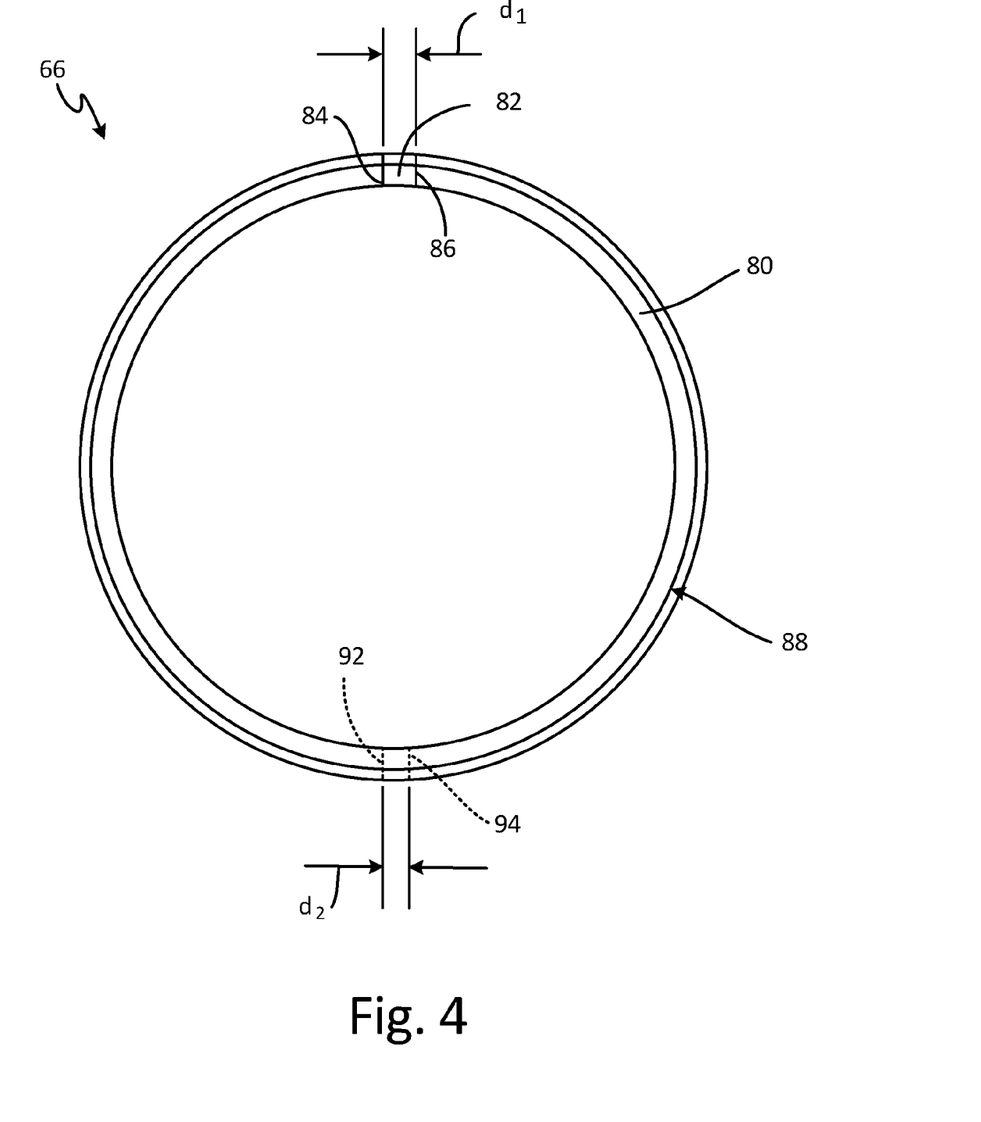
FIG. 4 is a side view of the multi-ply split-ring seal with integral assembly clip of FIG. 3.

FIGS. 3 and 4 show one embodiment of seal assembly 66. FIG. 3 is a cross-sectional view of seal assembly 66. FIG. 4 is a side view of seal assembly 66 in FIG. 3 looking aftward. Seal assembly 66 can be a multi-ply (e.g., two-ply) split-ring seal with an integral assembly clip. Seal assembly 66 can include split-ring seal 80 and split-ring seal 82. Split-ring seal 82 can be slidably received and nested in split-ring seal 80. Split-ring seal 80 can include circumferentially separated ends 84 and 86 (shown in FIG. 4) and laterally separated edges 88 and 90 (shown in FIG. 3). Likewise, split-ring 82 can include circumferentially separated ends 92 and 94 (shown in FIG. 4) and laterally separated edges 96 and 98 (shown in FIG. 3). Ends 84 and 86 can be separated from ends 92 and 94 by about 180 degrees to reduce leakage through the plies. A body portion of each of split-ring seal 80 and split-ring seal 82 can undulate to form a W-type or related seal having one or more turns 99a-d, capable of being compressed between first component 62 and second component 64. Each turn 99a-d can substantially form an approximately 180 degree arc with a convex surface facing radially inward or outward toward axially extending portions of components 62 and 64, with adjacent turns facing opposite directions. Although the present disclosure illustrates W-seals, it will be understood by one skilled in the art that the number of undulations can be increased or decreased.

Having two or more split-rings (plies) can increase strength and rigidity of the seal assembly 66 and allow for thermal expansion without buckling, as each split-ring seal 80 and 82 is capable of slidably expanding relative to the other split-ring seal 80 and 82. Some leakage may occur at the interface of ends 84 and 86 and the body portion of split-ring seal 82 and at the interface of ends 92 and 94 and the body portion of split-ring seal 80. However, leakage can be minimized by closely fitting split-ring seals 80 and 82 together, and generally, any negative impact caused by small amounts of leakage is outweighed by the aforementioned benefits of the multi-ply seal assembly. To allow for thermal expansion along a circumference, ends 84 and 86 can be separated by a distance ($d_1$) along the circumference of split-ring seal 80 (shown in FIG. 4). Likewise, ends 92 and 94 can be separated a distance ($d_2$) along the circumference of split-ring seal 82 (shown in FIG. 4). The distances $d_1$ and $d_2$ can generally be equal to one another and can be an arc length corresponding approximately to a five degree angle. However, it will be understood by one skilled in the art, that $d_1$ and $d_2$ can be varied as necessary (increased or decreased) to accommodate thermal expansion of split-ring seals 80 and 82.

Split-ring seals 80 and 82 can have integral clip portions 100 and 102, respectively, extending circumferentially from first end 84 to second end 68 and from third end 92 to fourth end 94. Integral clip portions 100 and 102 can clip or snap on to first component 62 to retain seal assembly 66 in position during assembly. Traditional W-seals without integral clip portions must be tack welded, glued, or otherwise fastened to one component to maintain position during assembly. With or without fastening, traditional W-seals, particularly single-ply full-ring W-seal have a tendency to be improperly pinched between components. Pinching can occur due to blind assembly (inability to visually inspect positioning of the W-seal during assembly) and delicate or flimsy construction of the W-seal, which allows the W-seal to hang downward outside of an ideal positioning for assembly. Integral clip portions 100 and 102 can lock seal assembly 66 in position and can also provide rigidity to seal assembly 66, thereby limiting the tendency of pinching due to downward hanging. The use of multiple plies or split-ring seals also increases rigidity for improved assembly. Integral clip portion 100 can have two bent portions including axially extending portion 100a and radially extending portions 100b and 100c, extending from either side of axially extending portion 100a, and bends 100d and 100e joining axial portion 100a with radial portions 100b and 100c. Likewise integral clip portion 102 can have axially extending portion 102a and radially extending portions 102b and 102c, extending from either side of axially extending portion 100b, and bends 102d and 102e joining axial portion 102a with radial portions 102b and 102c. Axial surfaces 100a and 102a can be substantially linear in cross-section. Bends 100d, 100e, 102d, and 102e can have curved surfaces forming an arc correlating with an angle substantially less than 180 degrees (e.g., 90 degrees) upon assembly. Radially extending portions 100b and 102b can be adjacent first side 110 of first component 62. Radially extending portions 100c and 102c can be adjacent second side 112 of first component 62 opposite first side 110. The terms "radially extending" and "axial extending" are relative terms used merely for the sake of explaining illustrated embodiments, and are provided as reference to the orientation of seal assembly 66 in the disclosed gas turbine engine. It will be understood by one skilled in the art that seal assembly 66 can be disposed in other directions, in which the terms "axially extending" and "radially extending" no longer apply as used in relation to the present embodiment. Radially extending portions 100b and 102b can be tightly biased toward radially extending portions 100c and 102c, requiring mechanical means to open integral clip portions 100 and 102 in order to clip seal assembly 66 onto first component 62. The tight biasing can provide additional rigidity to seal assembly 66 during assembly and operation. However, it will be understood by one skilled in the art that such tight biasing may not be necessary for all applications and can be modified as desired or as necessary. Additionally, although integral clip portions 100 and 102 alleviate the need for tack welds, glue, or similar means of fastening, such mechanisms can be used in combination with integral clip portions 100 and 102.

Split-ring seal 80 can have sealing lobe 114 adjacent edge 88. Sealing lobe 114 can have a convex curved surface extending laterally outward from edge 88. Sealing lobe 114 can be compressed against second component 64 upon assembly. The curved outwardly extending shape of sealing lobe 114 can allow increased pressure to be placed on a reduced contact area, thereby improving a seal between seal assembly 66 and second component 64 at the contact area, when assembled. Split-ring seal 82 can have sealing lobe 116 adjacent radially extending portion 102b of second clip portion 102. Sealing lobe 116 can have a convex curved surface extending toward and biased toward radially extending portion 102c. Sealing lobe 116 can extend from a plane that is approximately perpendicular to a plane from which turns 99a-d extend, such that sealing lobe 116 can be compressed against first side 110 of first component 62 upon assembly. Like sealing lobe 114, the curved outwardly extending shape of sealing lobe 116 improves a seal between seal assembly 66 and first component 62. Split-ring seal 82 can additionally have sealing lobe 118 adjacent edge 98. Sealing lobe 118 can have a convex curved surface extending laterally inward of edge 98, such that sealing lobe 118 contacts second side 112 of first component 62 upon assembly. Sealing lobe 118 can be biased toward sealing lobe 116. Although disclosed as a "sealing" lobe, sealing lobe 118 can have a primary function of providing a tight fit to first component 62, while secondarily providing a redundant seal to sealing lobe 116. It will be understood by one skilled in the art that sealing lobe 118 can be modified or removed without adverse impact to the effectiveness of seal assembly 66.

As shown in FIG. 3, split-ring seal 82 is closely nested in split-ring seal 80 and therefore split-ring seals 80 and 82 can be very similar in shape. In general, split-ring seals 80 and 82 can be formed by rolling. Split-ring seals 80 and 82 can be rolled separately and then assembled together; however, other manufacturing methods can be used. Split-ring seals 80 and 82 can generally consist of nickel based alloys, having a thickness ($t_s$) of 5-7 mils (0.127-0.178 mm); however, the material and thickness can be varied as appropriate for varying applications.

Figure 5:
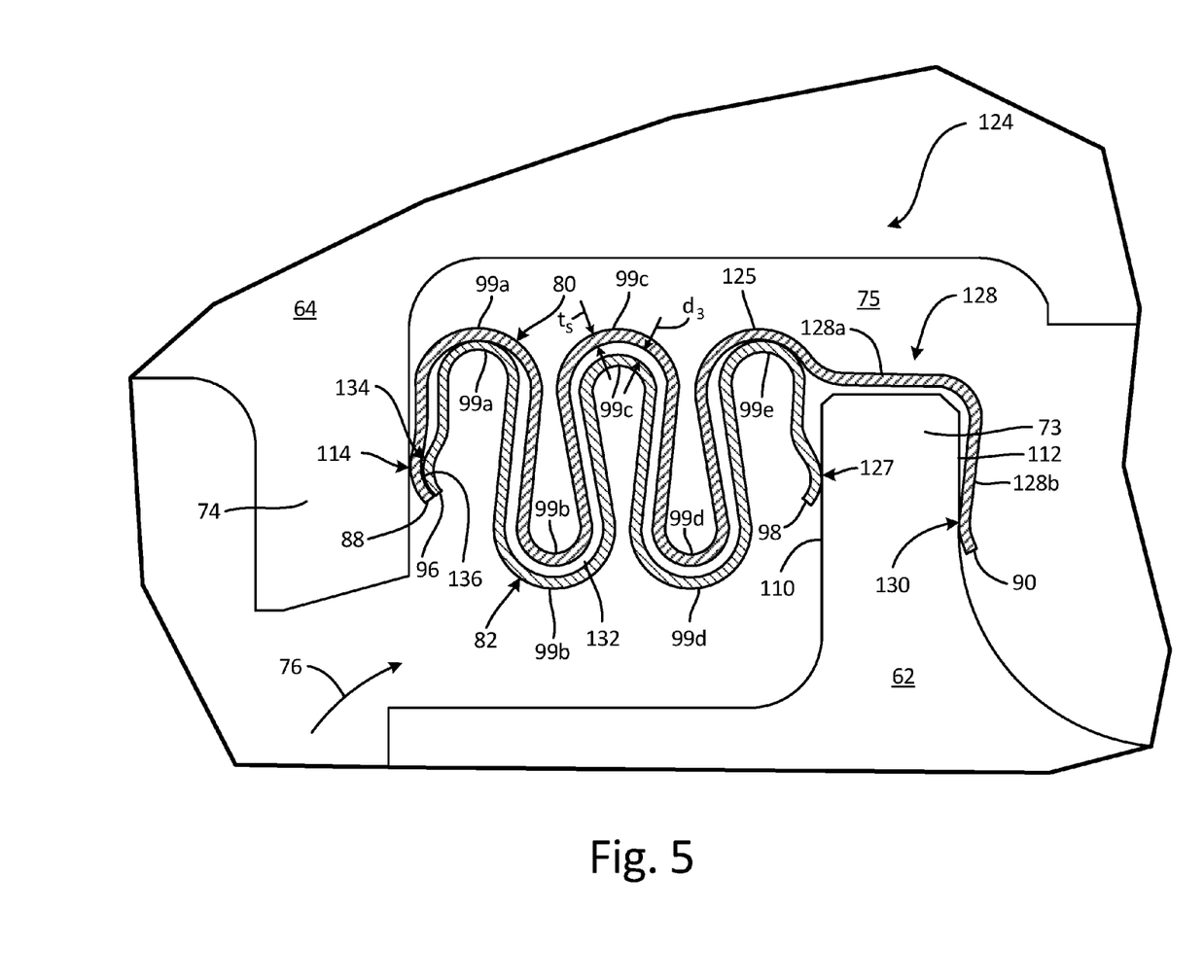
FIG. 5 is a cross-sectional view of another embodiment of the multi-ply split-ring seal with integral assembly clip, taken along line 5-5 of FIG. 6.
Figure 6:
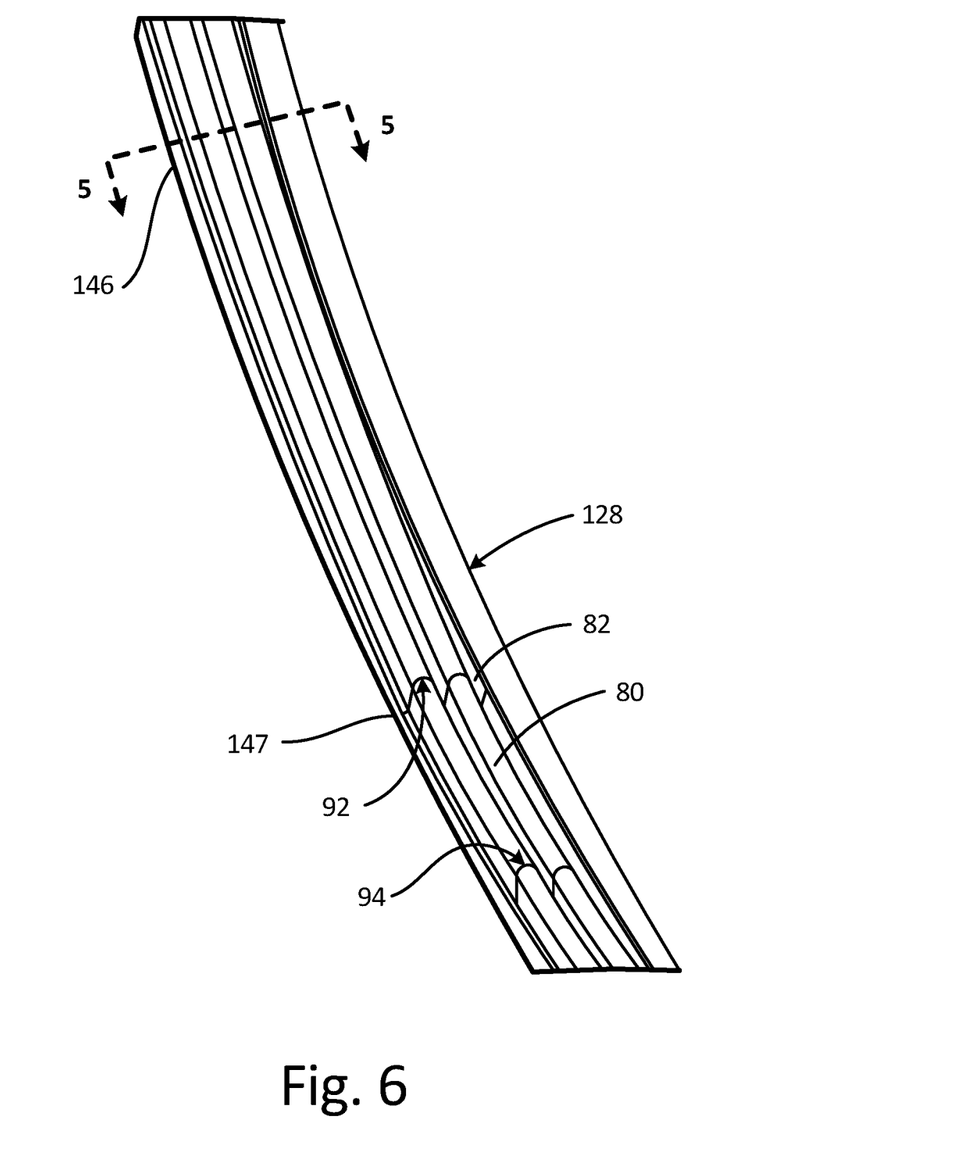
FIG. 6 is a perspective view of an end portion of the seal with integral clip assembly of FIG. 5.

FIGS. 5 and 6 illustrate another embodiment of the multi-ply split-ring seal with integral assembly clip. FIG. 5 is a cross-sectional view of seal assembly 124. FIG. 6 is a perspective view of an end portion of seal assembly 124. Seal assembly 124 is similar to seal assembly 66, having split-ring seal 80 with circumferentially separated ends 84 and 86, laterally separated edges 88 and 90, and sealing lobe 114; and split-ring seal 82 slidably nested in split-ring seal 80 and having circumferentially separated ends 92 and 94 and laterally separated edges 96 and 98. Distinct from seal assembly 66, split-ring seal 82 on seal assembly 124 does not include integral clip portion 102, while split-ring 80 does. Additionally, as shown in FIG. 5, split-ring 82 can have additional turn 99e and split-ring 80 can have partial turn 125. Partial turn 125 can have a convex curved surface directed radially outward. Split-ring seal 82 can include sealing lobe 127 adjacent to edge 98. Sealing lobe 127 can have a convex surface extending laterally outward from edge 98 and can be compressed against first side 110 of first component 62 upon assembly to form a seal. Combined, sealing lobes 114 and 127 serve to seal cooling cavity 75 from core gas flow 76.

Split-ring seal 80 can have integral clip portion 128 adjacent edge 90. Integral clip portion 128 can have one bent portion, including axially extending portion 128a, radially extending portion 128b, and bend 128c joining axially extending portion 128a and radially extending portion 128b at a substantially 90 degree angle upon assembly. Radially extending portion 128b can be adjacent edge 90. As previously discussed, the terms "axially extending" and "radially extending" are relative terms used merely for the sake of explaining illustrated embodiments, and are provided as reference to the orientation of seal assembly 128 in the disclosed gas turbine engine. It will be understood by one skilled in the art that seal assembly 128 can be disposed in other directions, in which the terms "axially extending" and "radially extending" no longer apply as used in relation to the present embodiment. Radially extending portion 128b can be biased toward sealing lobe 127 and can assembled in contact with second side 112 of first component 62. Combined, sealing lobe 127 and radially extending portion 128b can secure seal assembly 124 to first component 62. Split-ring seal 80 can additionally include sealing lobe 130 adjacent edge 90 and biased toward sealing lobe 127. Sealing lobe 130 can have a convex curved surface extending laterally inward of edge 90, which can thereby concentrate a pressure applied by integral clip portion 128 on first component 62 upon assembly. Similar to sealing lobe 118, sealing lobe 130 can serve both to form a redundant seal to second sealing lobe 127 and to provide a tight fit to first component 62. Sealing lobe 130 is not necessary to secure seal assembly 124 to first component 62 and therefore can be modified or removed without substantially impacting the effectiveness of seal assembly 124.

Seal assembly 124 can include one or more insulating plenums 132 to reduce heat transfer between core gas flow 76 and cooling cavity 75. Split-ring seal 80 can be radially separated from split-ring seal 82 along at least a portion of the circumference to create one or more insulating plenums 132, thereby forming a gap or gaps. A distance ($d_3$) between split-ring seals 80 and 82 in at least a portion of seal assembly 128 between edges 88 and 90 and edges 96 and 98 forming the gap can be substantially equal to or greater than a thickness ($t_s$) of split-ring seal 80 (generally 5-7 mils (0.127-0.178 mm), but adjustable based on application). The increased distance $d_3$ can create one or more larger plenums 132, which can serve as insulating layers between split-ring seals 80 and 82. Distance $d_3$ can vary laterally as shown in FIG. 5. For instance, $d_3$ can be smaller nearing turns 136 and 138 as well as sealing lobe 114.

To limit leakage across seal assembly 128, plenums 132 can be closed at or near lateral edges 88, 90, 96, and 98 and circumferential ends 84, 86, 92, and 94. As shown in FIG. 5, split-ring seal 82 can have sealing lobe 134 adjacent edge 96. Sealing lobe 134 can match a shape of sealing lobe 114, having a convex curved surface extending laterally outward. Sealing lobe 114 can be compressed against a concave inner surface 136 of sealing lobe 114 upon assembly to close plenum 132 between edges 88 and 96. Additionally, split-ring seal 80 can contact split-ring seal 82 along the circumference at first turn 136 and laterally opposite second turn 138. First turn 136 can be adjacent second component 64 and second turn 138 can be adjacent first component 62. First and second turns 136 and 138 can be separated by at least one additional turn. As shown in FIG. 5, three additional turns 140, 142, and 144 separate first and second turns 136 and 138. Split-ring seal 80 can contact split-ring seal 82 at additional turns 140, 142, and 144 or can be separated from additional turns 140, 142, and 144 as shown in FIG. 5 to provide additional insulating capacity.

FIG. 6 shows closure of ends 92 and 94 of split-ring seal 82 against the body of split-ring seal 80. As shown in FIG. 6, split-rings 80 and 82 come together at end 92 to close plenum 132. One or both of split-rings 80 and 82 can gradually move inward from point 146, which correlates with a separation illustrated in FIG. 5, to point 147 where end 92 of split-ring seal 82 meets the body portion of split-ring seal 80. The gradual closing of plenum 132 can generally extend 1-2 inches (25.4-50.8 mm) along the circumference of split-ring seal 80. Ends 84, 86, and 94, although not all shown, can close in the same or similar manner. Alternatively, ends 84, 86, 92, and 94 can be stepped inward to close plenum 132.

Figure 7:
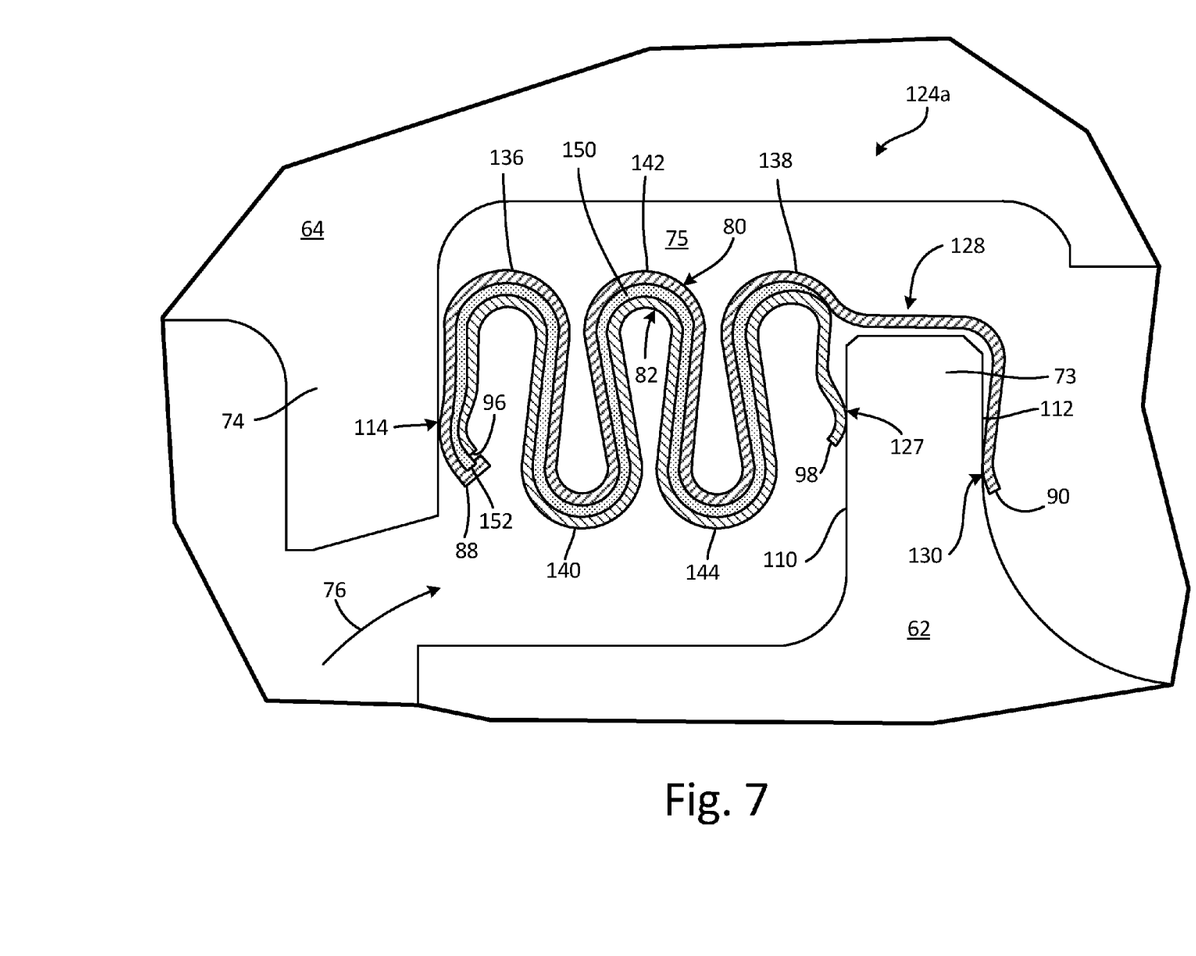
FIG. 7 is a cross-sectional view of another embodiment of the multi-ply split-ring seal with integral clip assembly.

Instead of having air plenum 132, seal assembly 124 can have thermally insulating member 150 as shown in FIG. 7. Insulating member 150 can be a ceramic or carbon fiber blanket or similar insulating member as known in the art. FIG. 7 is a cross-sectional view of modified seal assembly 124a. Seal assembly 124a can have an insulating member nested between split-ring seals 80 and 82. Insulating member 150 can take the place of plenum 132 or can more fully extend laterally between split-ring seals 80 and 82 as shown in FIG. 7. As shown in FIG. 7, edge 88 of split-ring seal 80 can extend beyond edge 96 of split-ring seal 82 and can fold over edge 152 of insulating member 150 to secure insulting member 150 in place and reduce leakage through insulating member 150. Alternatively, edge 96 can extend beyond edge 88 and fold over insulating member 150, provided the alternative does not interfere with proper sealing of seal assembly 124a. Ends 84, 86, 92, and 94 of seal assembly 124a can be stepped inward according to FIG. 6 and related disclosure, such that ends 84 and 86 of split-ring seal 80 have step 146 to close against split-ring seal 82, and ends 92 and 94 are similarly stepped in to close against split-ring seal 80.

Figure 8:
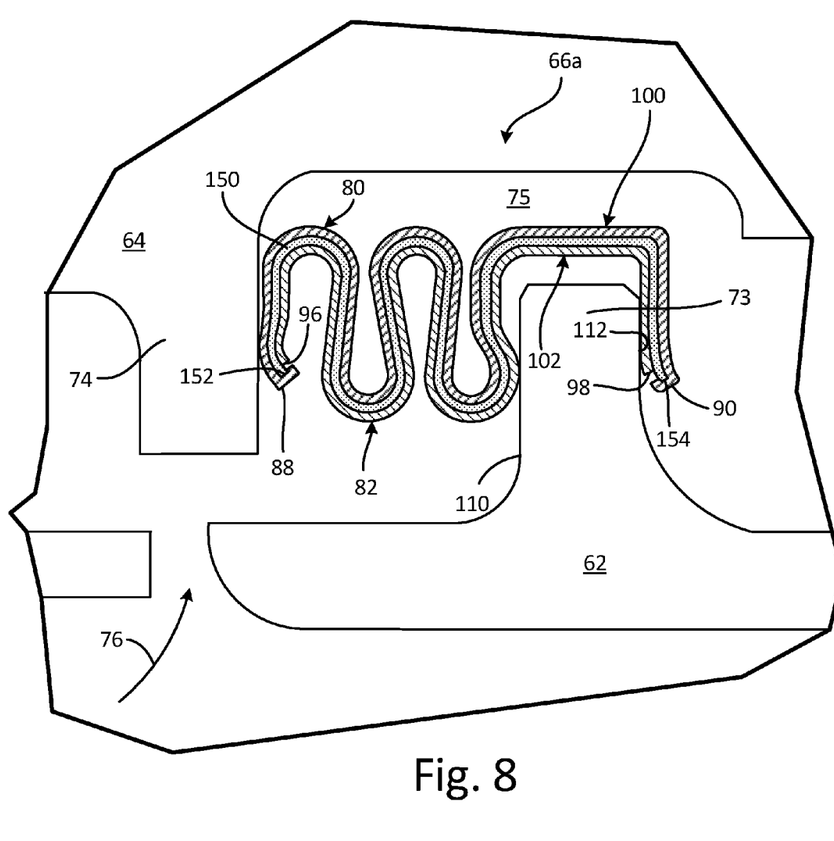
FIG. 8 is a cross-sectional view of another embodiment of the multi-ply split-ring seal with integral clip assembly.

Incorporation of an insulating member is not limited to seal assemblies 124 and 124a. FIG. 8 is a cross-sectional view of a modified embodiment of the multi-ply split ring seal assembly shown in FIG. 3, showing modified seal assembly 66a with insulating member 150 disposed between split-ring seals 80 and 82. Similar to the embodiment shown in FIG. 7, edge 88 of split-ring seal 80 can extend beyond forward end 92 of split-ring seal and fold over edge 152 of insulating member 150 to secure insulating member 150 in place and reduce leakage through insulating member 150. On the laterally opposite edges 90 and 98, edge 98 of split-ring seal 82 can extend beyond edge 90 of split-ring seal 80 and fold over opposite end 154 of insulating member 150. Alternatively, edge 96 can fold over insulating member 150 and edge 90 can fold over insulating member 150, or any combination of the above that allows for proper sealing and securing of seal assembly 66a. Ends 84, 86, 92, and 94 of seal assembly 66a can be stepped inward according to FIG. 6 and related disclosure.

Figure 9:
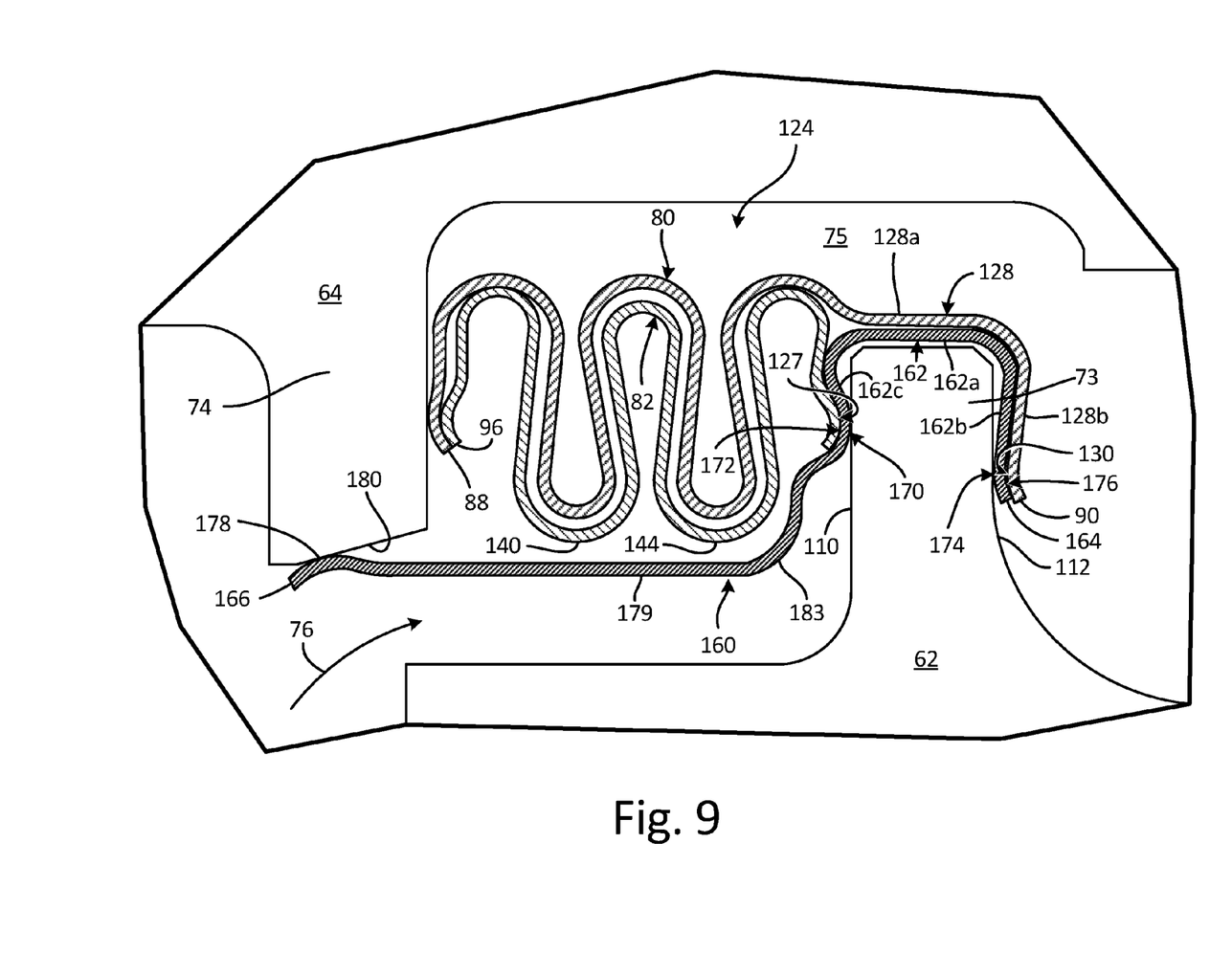
FIG. 9 is a cross-sectional view of the multi-ply split-ring seal of FIGS. 5 and 6 with a heat shield.
Figure 10:
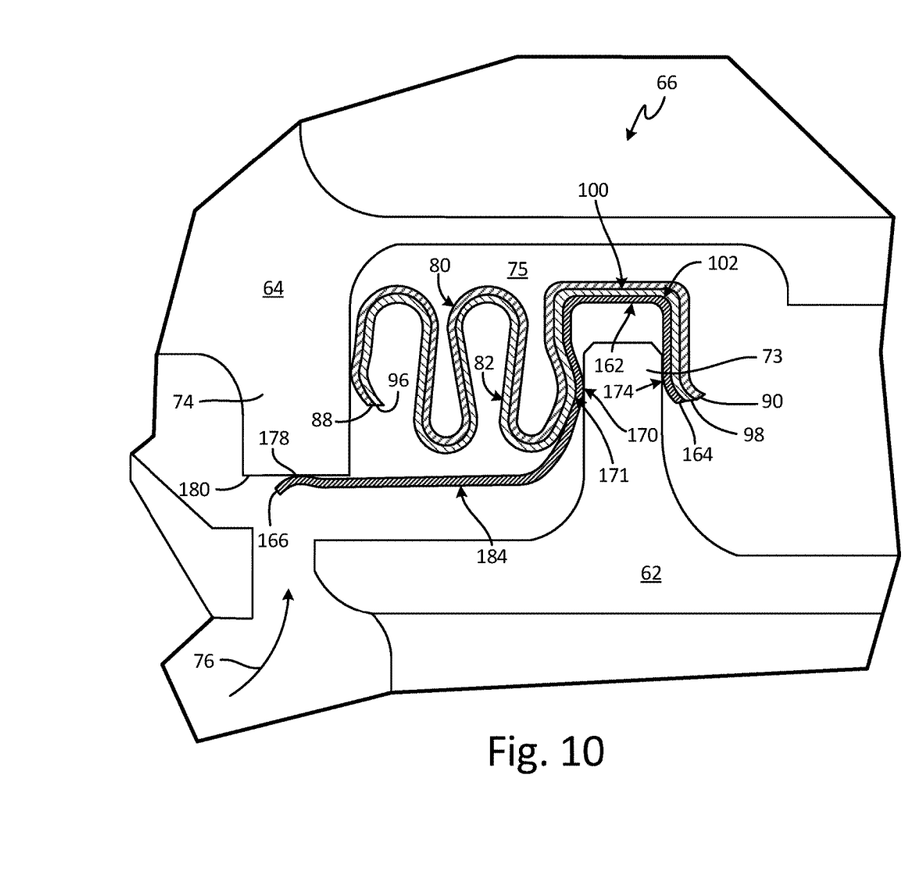
FIG. 10 is a cross-sectional view of the multi-ply split-ring seal of FIG. 3 with a heat shield.

FIGS. 9 and 10 are cross-sectional views of the multi-ply split-ring seal assemblies (124 and 66) of FIGS. 5 and 3, respectively, with the addition of a heat shield. Heat shields may find limited application in the compressor section of the gas turbine engine, but can provide added benefit in the turbine section where temperatures are elevated. As shown in FIG. 9, annular heat shield 160 can be nested in integral clip portion 128, forming additional integral clip portion 162. Heat shield 160 can have edge 164 positioned adjacent edge 90 of split-ring seal 80, and can have laterally opposite edge 166 extending laterally outward form edge 88 of split-ring seal 80. Integral clip portion 162 can have axial extending portion 162a and radially extending portions 162b and 162c positioned on either side of axially extending portion 162a and such that radially extending portion 162b is adjacent edge 164. As previously stated, the terms "axially extending" and "radially extending" are relative terms used merely for the sake of explaining illustrated embodiments. Heat shield 160 can have sealing lobe 170 adjacent radially extending portion 162c. Sealing lobe 170 can have a convex curved surface extending laterally outward. Sealing lobe 170 can displace sealing lobe 127 of split-ring seal 82, such that sealing lobe 170 is compressed against first side 110 of first component 62 upon assembly and such that sealing lobe 127 is compressed into concave inner surface 172 of sealing lobe 170. Likewise radially extending portion 162b can displace radially extending portion 128b of split-ring seal 80 away from second side 112 of first component 62 upon assembly. Sealing lobe 170 and radially extending portion 162b can be tightly biased toward each other to form a tight fit over first component 62. Similar to previously disclosed embodiments and as shown in FIG. 9, heat shield 160 can have sealing lobe 174 adjacent edge 164. Sealing lobe 174 can have a convex curved surface extending laterally inward from edge 164, such that biasing pressure can be concentrated at edge 164. Sealing lobe 130 of split-ring seal can be fitted to inner concave surface 176 of sealing lobe 174. Sealing lobe 174 can serve as a redundant seal for sealing lobe 172 and can provide a tight fit over first component 62. As disclosed for previous embodiments, sealing lobe 174 can be modified or removed without significantly impacting the effectiveness of seal assembly 124.

Heat shield 160 can have lobe 178 adjacent edge 166. Lobe 178 can have a convex curved surface extending radially outward of edge 166. Lobe 178 and axially extending portion 179 can be biased toward turns 140 and 144 of split-ring seals 80 and 82 and can compress against wall 180 upon assembly. Wall 180 can be slanted to press heat shield 160 radially inward during assembly to form a tight fit. Additionally, heat shield can have curved section 183 to provide a closer fit to split-ring seal 82. Heat shield 160 can reduce thermal stresses on first and second spit-ring seals 80 and 82 and reduce heat transfer across seal assembly 138.

FIG. 10 shows seal assembly 66 with heat shield 184. Heat shield 184 can be structurally very similar to heat shield 160, having edge 164; edge 166; integral clip portion 162, configured to clip onto first component 62; laterally extending convex sealing lobe 170 displacing and being compressed by sealing lobe 171 of split-ring seal 82 upon assembly; laterally extending convex sealing lobe 174 adjacent edge 164 and configured to localize pressure against first component 62; and radially extending sealing lobe 178 configured to engage wall 180. Unlike the embodiment disclosed in FIG. 9, integral clip portion 162 of heat shield 184 can be nested in integral clip portion 102 of split-ring seal 82, which can be nested in integral clip portion 100 of split-ring seal 80, thereby forming a three-ply integral clip assembly. The three-ply integral clip assembly can improve strength of fit to first component 62 and rigidity of seal assembly 66. Additionally, the incorporation of heat shield 184 reduces thermal stress on split-ring seals and reduces heat transfer across seal assembly 66.

The disclosed multi-ply split ring seal assemblies with optional heat shield can facilitate assembly in gas turbine engines, reduce or eliminate seal buckling due to thermal expansion, reduce additional thermal stresses to the seal assembly, increase the lifetime of the seal assembly, and reduce heat transfer across the seal assembly. While the present disclosure relates to assembly in gas turbine engines, it will be understood by one skilled in the art that the disclosed seal assemblies can be adopted for use in multiple applications, particularly where traditional W-seals and related compressible seals are used.

Discussion of Possible Embodiments

The following are non-exclusive descriptions of possible embodiments of the present invention.

A seal assembly for a gas turbine engine includes first and second split-ring seal with the second split-ring seal being slidably received and nested in the first seal. The first split-ring seal includes circumferentially separated first and second ends, laterally separated first and second edges, a first sealing lobe adjacent the first edge, and a first integral clip portion adjacent the second edge. The first sealing lobe includes a curved surface extending laterally outward from the first edge. The second split-ring seal can include circumferentially separated third and fourth ends, and laterally separated third and fourth edges.

The seal assembly of the preceding paragraph can optionally include, additionally and/or alternatively, any one or more of the following features, configurations and/or additional components:

A further embodiment of the foregoing seal assembly, wherein the first clip portion can circumferentially extend from the first end to the second end.

A further embodiment of the foregoing seal assembly, wherein at least a portion of each of the first and second seals can be substantially W-shaped.

A further embodiment of the foregoing seal assembly, wherein the second split-ring seal can include a second sealing lobe adjacent the fourth edge. The second sealing lobe can be a curved surface extending laterally outward from the fourth edge.

A further embodiment of the foregoing seal assembly, wherein the first split-ring seal further can include a third sealing lobe adjacent the second edge. The third sealing lobe can be a curved surface extending laterally inward from the second edge and the second sealing lobe can be biased toward the third sealing lobe.

A further embodiment of the foregoing seal assembly can include a first component having a first side and second side located opposite the first side. The second sealing lobe can contact the first side and the third sealing lobe can contact the second side.

A further embodiment of the foregoing seal assembly, wherein the first split-ring seal can be radially separated from the second split-ring seal along at least a portion of the circumference, and a distance between the first and second seal in at least a portion of the seal assembly between the first and second edges and third and fourth edges can be substantially equal to or greater than a thickness of the first split-ring seal.

A further embodiment of the foregoing seal assembly, wherein the first split-ring seal can contact the second seal along the circumference at a first bend and at a laterally opposite second bend. The first and second bends can be separated by at least one additional bend.

A further embodiment of the foregoing seal assembly, wherein the first, second, third and fourth ends can each comprise a step to substantially close one or more gaps between the first split-ring seal and the second split-ring seal.

A further embodiment of the foregoing seal assembly can include insulating member. The insulating member can be nested between the first and second split-ring seals.

A further embodiment of the foregoing seal assembly, wherein first edge of the first split-ring seal can extend beyond the third edge of the second split-ring seal and fold over an edge of the insulating member.

A further embodiment of the foregoing seal assembly, wherein the second split-ring seal can include a second integral clip portion adjacent the fourth edge. The integral clip portion can include first and second radially extending portions, and an axial extending portion. The axial extending portion can separate the first and second radially extending portions, and the second radially extending portion can be adjacent the fourth edge. A fourth sealing lobe adjacent the first radial extending portion can include a curved surface extending toward and biased toward the second radially extending portion.

A further embodiment of the foregoing seal assembly can include an annular heat shield nested in the second clip portion. The annular heat shield can include a fifth edge positioned adjacent the fourth edge of the second split-ring seal and a sixth edge extending laterally outward from the first edge of the first split-ring seal.

A further embodiment of the foregoing seal assembly, wherein a portion of the first and second split-ring seals extending between the first and second edges and the first and second clip portions can have a substantially undulating shape.

A further embodiment of the foregoing seal assembly can include a first component having a first side and second side located opposite the first side. The fourth sealing lobe can contact the first side and the first radially extending portion can contact the second side.

A further embodiment of the foregoing seal assembly can include an annular heat shield nested in the first clip portion. The annular heat shield can include a fifth edge positioned adjacent the second edge of the first split-ring seal and a sixth edge extending laterally outward from the first edge of the first split-ring seal.

A further embodiment of the foregoing seal assembly, wherein the second split-ring seal can include a second sealing lobe adjacent the fourth edge. The second sealing lobe can have a curved surface extending outward from the fourth edge. The heat shield can include a sixth sealing lobe having a curvature substantially matching the curved surface of the second sealing lobe and positioned in contact with the second sealing lobe.

A method of sealing a cavity in a gas turbine engine includes clipping a portion of a multi-ply split-ring seal to a first component of a gas turbine engine and compressing a portion of each ply of the multi-ply seal between the first component and a second component of the gas turbine engine.

The method of the preceding paragraph can optionally include, additionally and/or alternatively, any one or more of the following features, configurations and/or additional components:

A further embodiment of the foregoing method can include clipping a heat shield to the first component of the gas turbine engine. The heat shield can be disposed between the first component and the seal.

A further embodiment of the foregoing method providing an insulating layer between plies of the multi-ply seal.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A seal assembly for a gas turbine engine, the assembly comprising:
   a first split-ring seal comprising:
      circumferentially separated first and second ends;
      laterally separated first and second edges;
      a first sealing lobe adjacent the first edge, wherein the first sealing lobe comprises a curved surface extending laterally outward from the first edge; and
      a first integral clip portion adjacent the second edge;
   a second split-ring seal slidably received and nested in the first seal, the second split-ring seal comprising:
      circumferentially separated third and fourth ends;
      laterally separated third and fourth edges adjacent to first and second edges, respectively; and
      a second integral clip portion adjacent to the fourth edge; and
   an annular heat shield comprising:
      laterally separated fifth and sixth edges;
      a third integral clip portion, the third integral clip portion slidably received and nested in the second integral clip portion such that the first, second, and third integral clip portions together form a single concave shape configured to clip to a flange to position the seal assembly in the gas turbine engine; and
      an axially extending portion radially separated from a portion of the nested first and second split-ring seals.

2. The seal assembly of claim 1, wherein the first, second, and third clip portions circumferentially extend from the first end to the second end.

3. The seal assembly of claim 1, wherein at least a portion of each of the first and second seals is substantially W-shaped.

4. The seal assembly of claim 1, wherein the fifth edge of the annular heat shield-extends laterally outward from the first edge of the first split-ring seal.

5. The seal assembly of claim 4, wherein a portion of the first and second split-ring seals extending between the first and second edges and the first and second clip portions has a substantially undulating shape.

6. The seal assembly of claim 1, wherein the single concave shape formed by the first, second, and third integral clip portions comprises:
   first and second radially extending portions; and
   an axially extending portion separating the first and second radially extending portions;
   wherein the first radially extending portion is biased toward the second radially extending portion and the second radially extending portion is biased toward the first radially extending portion.

7. The seal assembly of claim 6, wherein the annular heat shield includes a second sealing lobe on the first radial extending portion, wherein the second sealing lobe comprises a curved surface extending toward and biased toward the second radially extending portion.

8. The seal assembly of claim 7, wherein the annular heat shield includes a third sealing lobe on the second radially extending portion, wherein the third sealing lobe comprises a curved surface extending toward and biased toward the first radially extending portion.

9. The seal assembly of claim 4, wherein the annular heat shield includes a fourth sealing lobe adjacent to the fifth edge and having a curved surface extending radially outward from the annular heat shield and biased radially outward toward the first and second split-ring seals.

10. The seal assembly of claim 9 and further comprising a second component comprising:
   a third side; and
   a fourth side adjacent and substantially perpendicular to the third side;

wherein the first lobe of the first split-ring seal is biased toward the third side and the fourth lobe of the annular heat shield is biased toward the fourth side.

11. The seal assembly of claim 8, further comprising:
a first component having a first side and second side located opposite the first side, wherein the second sealing lobe is biased against the first side and the third sealing lobe is biased against the second side.

12. A seal assembly for a gas turbine engine, the assembly comprising:
a multi-ply split-ring seal formed from nested first and second split-ring seals, the multi-ply split ring seal having an undulating portion and a first clip portion; and
an annular heat shield having an axially extending portion and a second clip portion, wherein the axially extending portion is radially separated from the undulating portion of the multi-ply split-ring seal and wherein the second clip portion is slideably received and nested in the first clip portion;
wherein the first and second clip portions form a concave shape configured to clip to a flange to position the seal assembly in the gas turbine engine.

* * * * *